Dec. 6, 1960 L. G. HALL ET AL 2,963,335

DIRECT WRITING OSCILLOGRAPH

Filed Aug. 26, 1957

INVENTORS
LAWRENCE G. HALL
GEORGE D. PERKINS
BY
Christie, Parker & Hale
ATTORNEYS United States Patent Office 2,963,335

Patented Dec. 6, 1960

2,963,335

DIRECT WRITING OSCILLOGRAPH

Lawrence G. Hall, West Covina, and George D. Perkins, Duarte, Calif., assignors, by mesne assignments, to Consolidated Electrodynamics Corporation, Pasadena, Calif., a corporation of California Filed Aug. 26, 1957, Ser. No. 680,130

1 Claim. (Cl. 346—74)

This invention relates to oscillographs, and more particularly, is concerned with a direct-writing oscillograph.

Heretofore, oscillographs have been developed using a stylus which is caused to trace out the pattern of an input voltage wave form as a function of time. The stylus may write on a recording medium, as by ink, or the paper may be specially treated, as with an electrochemical material, to produce a trace in response to the movement of the stylus. Because reasonably large deflections are required and because of the inertia of the stylus, the frequencies which can be recorded are limited to fairly low values in this type of oscillograph.

Oscillographs using a light beam deflected by a galvanometer have also heretofore been used. Large deflections can be produced and the inertia of the moving system maintained at a fairly low value by this technique. However, recording of the movement of the light beam has required photographic techniques requiring considerable processing of the recording medium before the record is available.

By the present invention, direct writing is provided on the recording medium without the necessity of any processing, from movements of a light beam by a galvanometer in response to the measured input signal. Thus the present invention provides apparatus combining the advantages of the stylus type of oscillograph with its direct writing arrangement, plus the low inertia and higher frequency response of the deflected light beam type of apparatus.

In brief, the invention includes a recording medium having an electrochemical layer which is sensitized by the passage of current therethrough. Photoconductive material, either in the form of a layer on the recording medium or in the form of a surface layer on a line electrode in contact with the surface of the paper, is provided. Another electrode is provided on the opposite side of the recording medium and a potential maintained between the layer of photoconductive material and said electrode. The recording medium is scanned by a light beam from a galvanometer, the light beam falling on the photoconductive material. Wherever the light beam strikes the photoconductive material, the resistance of the material is materially reduced, resulting in an increased current flow between the photoconductive material and the electrode in back of the recording medium. The resulting current flow produces an indication on the electrochemical layer of the recording medium.

For a better understanding of the invention, reference should be had to the accompanying drawings, wherein.

Figures 1, 2, 3:
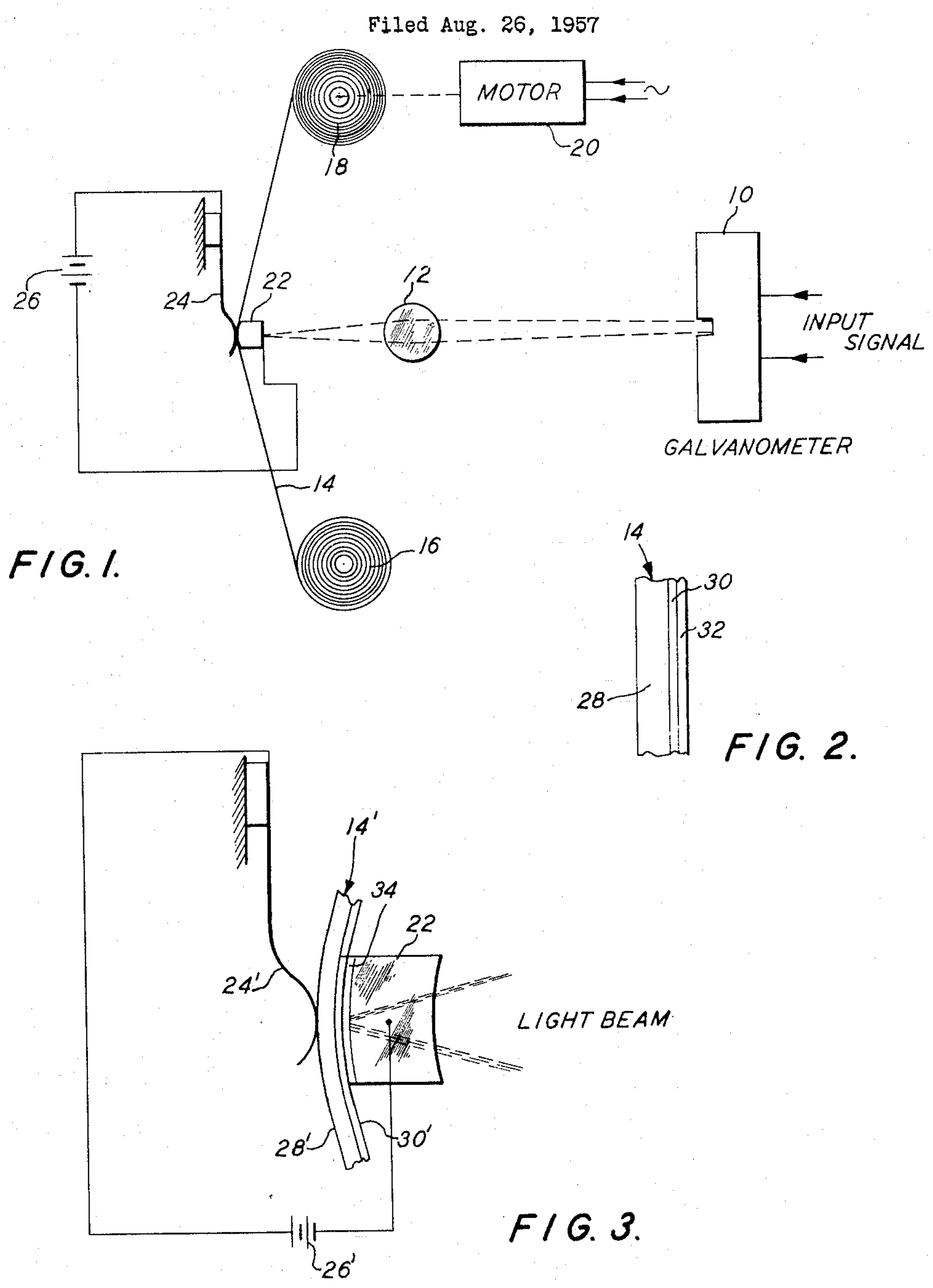
Fig. 1 is a schematic showing of one embodiment of the present invention.
Fig. 2 is an enlarged sectional view of the recording medium used in the apparatus of Fig. 1.
Fig. 3 is an enlarged fragmentary view of a modification of the apparatus of Fig. 1.

Referring to Fig. 1 in detail, the numeral 10 indicates generally a galvanometer which is responsive to an applied input signal. The galvanometer 10 is of a conventional type which operates to deflect a light beam in response to the movements of the galvanometer coil.

The deflected light beam from the galvanometer 10 is projected toward a cylindrical lens 12 which focuses the light beam at a point. The galvanometer 10 sweeps the light beam across the longitudinal extent of the cylindrical lens 12.

A suitable recording medium 14 is driven from a supply reel 16 onto a takeup reel 18 by a suitable motor drive 20 which rotates the takeup reel 18. The recording medium passes over a conductive glass electrode 22 which extends the width of the recording medium and lies substantially in the focal plane of the cylindrical lens 12. The electrode 22 is both transparent and electrically conductive. Thus the light beam is focused on the surface of the recording medium 14, the light beam passing through the glass of the electrode 22.

An electrode 24, preferably in the form of a plurality of spring fingers, contacts the recording medium 14 on the opposite side thereof from the glass electrode 22. A potential is maintained between the glass electrode 22 and the electrode 24 by a suitable potential source, such as a battery 26.

As best shown in Fig. 2, the recording medium comprises a backing layer 28 of suitable material having reasonably high tensile strength, such as paper. The paper may be impregnated with carbon to improve its conductivity. Overlying the paper is a layer 30 of electrochemical material which has the property that it is discolored by the passage of an electric current passing therethrough. Recording papers utilizing electrochemical coatings of this type are well known and available on the market. The coating may incorporate zinc oxide over a black undercoating, or may be made according to the teaching of Patent No. 2,606,807.

Overlying the electrochemical layer 30 is a layer 32 of photosensitive material. A number of materials which exhibit a photoconductive property are available, but preferably, materials which are white or light in color are employed. For example, activated cadmium sulfide or zinc oxide may be used. Photoconductive materials of this type have the property that their resistance to electric current varies over a wide range in the presence and in the absence of light. The "dark" resistance of the photoconductors is in the order of several hundred megohms, but in the presence of illumination, the resistance drops to the range of from 1000 to 100,000 ohms, depending on the intensity of the light. A suitable method of coating photoconductive material on large surfaces is described in the article "Large Area High Current Photoconductive Cells Using Cadmium Sulfide Powder" by F. H. Nicoll and B. Kazan, Journal of the Optical Society, vol. 145, page 647, August 1955.

Thus in operation, the light beam is scanned across the face of the recording medium 14 by the galvanometer 10 in response to an input signal. Wherever the light strikes the photoconductive layer, the resistance between the glass electrode 22 and the electrode 24 is greatly reduced, causing an increase in current flow. This increased current flow is sufficient to activate the electrochemical layer 30, producing an indication on the recording medium. The thickness of the photoconductive layer 32 may be only several thousandths and the darkening of the electrochemical layer 30 is readily visible through the photoconductive layer 32, thus providing a visible trace on the recording medium 14.

In the alternative arrangement of Fig. 3, the conductive glass electrode 22' is provided with a layer of photoconductive material 34 on the surface thereof in contact with the recording medium 14'. The recording medium 14' in turn consists of a backing 28' and an electrochemical layer 30', but no photoconductive layer as in the previously described embodiment of the invention. The modification of the invention described in Fig. 3 operates substantially the same. Sensitizing of the photoconductive layer 34 by light passing through the conductive glass electrode 22′ produces a localized current flow to the electrode 24′ by virtue of the potential source 26′. The result is a localized blackening of the electrochemical layer, producing a visible trace on the recording medium.

From the above description it will be seen that an oscillograph is provided which writes directly in response to a deflected light beam. No wet process developing is required. The trace record is immediately available in permanent form. While the invention has been particularly described in connection with a galvanometer to provide an oscillograph, it will be recognized that the dry process light image recording may be readily adapted to other fields where a light image must be recorded.

What is claimed is:

Oscillograph apparatus comprising a recording medium having an electrochemical layer and an overlying photoconductive layer, a transparent electrically conductive line electrode, means for moving the recording medium past said electrode, the photoconductive layer of the recording medium being in direct contact with the line electrode, means for scanning the recording medium through the transparent line electrode with a light beam in response to an input signal, and means for maintaining an electrical potential between the electrode and the recording medium.

References Cited in the file of this patent

UNITED STATES PATENTS

| | | |
|---|---|---|
| 2,432,303 | Fox | Dec. 9, 1947 |
| 2,692,178 | Grandadam | Oct. 19, 1954 |
| 2,752,833 | Jacob | July 3, 1956 |
| 2,764,693 | Jacobs et al. | Sept. 25, 1956 |
| 2,798,959 | Moncrieff-Yeates | July 9, 1957 |
| 2,798,960 | Moncrieff-Yeates | July 9, 1957 |
| 2,866,903 | Berchtold | Dec. 30, 1958 |

FOREIGN PATENTS

| | | |
|---|---|---|
| 188,030 | Great Britain | Oct. 23, 1922 |